(12) United States Patent
Kacin et al.

(10) Patent No.: US 9,210,044 B2
(45) Date of Patent: Dec. 8, 2015

(54) AUTOMATED REMEDIATION WITH AN APPLIANCE

(75) Inventors: Martin Kacin, Palo Alto, CA (US); David Douglas Kloba, Sunnyvale, CA (US)

(73) Assignee: Dell Products L.P., Round Rock, TX (US)

( * ) Notice: Subject to any disclaimer, the term of this patent is extended or adjusted under 35 U.S.C. 154(b) by 351 days.

(21) Appl. No.: 13/560,762

(22) Filed: Jul. 27, 2012

(65) Prior Publication Data

US 2014/0032449 A1 Jan. 30, 2014

(51) Int. Cl.
*G06N 5/00* (2006.01)
*G06F 1/00* (2006.01)
*H04L 12/24* (2006.01)

(52) U.S. Cl.
CPC ................................. *H04L 41/0883* (2013.01)

(58) Field of Classification Search
CPC ............. G06F 15/18; G06N 5/02; G06N 3/08
See application file for complete search history.

(56) References Cited

U.S. PATENT DOCUMENTS

| | | | |
|---|---|---|---|
| 2004/0201612 A1* | 10/2004 | Hild et al. | 345/736 |
| 2010/0161313 A1* | 6/2010 | Karttunen | 704/9 |
| 2011/0072506 A1* | 3/2011 | Law et al. | 726/11 |
| 2013/0073704 A1* | 3/2013 | Whitlock et al. | 709/223 |

* cited by examiner

*Primary Examiner* — Jeffrey A Gaffin
*Assistant Examiner* — Kalpana Bharadwaj
(74) *Attorney, Agent, or Firm* — Baker Botts L.L.P.

(57) ABSTRACT

In one embodiment, a method includes receiving information associated with the operation of one or more network devices, indexing the information for analysis, analyzing the information to determine a pattern in the information, generating one or more labels for at least a portion of the information based at least in part on the pattern, and making the information and labels available to a remediation system.

20 Claims, 4 Drawing Sheets

AUTOMATED REMEDIATION WITH AN APPLIANCE

TECHNICAL FIELD

The present disclosure relates generally to computer or network appliances, and more specifically to systems and methods for automated remediation in a network.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

The information handling system may include one or more operating systems. An operating system serves many functions, such as controlling access to hardware resources and controlling the execution of application software. Operating systems also provide resources and services to support application software. These resources and services may include a file system, a centralized configuration database (such as the registry found in Microsoft Windows operating systems), a directory service, a graphical user interface (GUI), a networking stack, device drivers, and device management software. In some instances, services may be provided by other application software running on the information handling system, such as a database server.

Some information handling systems are designed to interact with other information handling systems over a computer network connection. In particular, certain information handling systems may be designed to monitor, configure, and adjust the features, functionality, and software of other information handling systems by communicating with those information handling systems over a network connection. For example, one information handling system might be configured to manage the installation and updating of software on several other information handling systems.

In the context of the present disclosure, the term "network appliance" may refer to any device, such as an information handling system, which may include a combination of hardware, firmware, and/or software, that is capable of performing a set of operations or functions in connection with or over a computer network. The actual set of operations or functions a specific network appliance is capable of performing often depends on the hardware, firmware, and/or software included in that appliance. In the very least, however, a network appliance should be capable of being connected to a computer network. In some contexts, software enabling network appliance functionality may be incorporated into an existing computing device responsible for performing other functions as well.

For example, the Dell KACE K1000, a product of Dell Inc., is a network appliance that provides system management on a computer network. Some of the operations supported by the Dell KACE K1000 appliance include device discovery and inventory, patch management, configuration and policy management, organizational management, asset management, power management, software distribution, remote site replication, security audit and enforcement, and administrative alerts. As another example, the Dell KACE K2000, another product of Dell Inc., is a network appliance that provides computer software (e.g., operating systems) deployment over a computer network. Some of the operations supported by the Dell KACE K2000 appliance include disk imaging, device driver management, centralized deployment library, remote site management and remote administration, computer inventory scanning and assessment, network operating system installation, pre and post deployment configuration, user state migration, and system repair and recovery.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

In some contexts, it is desirable to have network management devices, such as network appliances, support large sets of operations to manage and maintain systems over a computer network. Users of a network including, for example, enterprise customers, may desire automated management of devices on the network with the ability for a network administrator, for example, to have input on how the automated management may proceed. A network appliance may provide part or all of this functionality. For example, data regarding the health or function of components of systems on a network (including, for example, servers, network devices, mobile or desktop machines, or other network appliances) may be collected by a network appliance and stored at a centralized place in the network, such as a data store. This data, which may be structured or unstructured, may then be indexed for fast querying or searching and for a variety of analytics. For example, after being indexed, the data may be searched and analyzed, either by a user (e.g. a network administrator) via a user interface or by a machine-learning unit (which may be a part of a network appliance). Once the data has been analyzed, a user may generate tags for some or all of the data based on, for example, patterns seen in the data, and the tagged data may then be sent to a network appliance for remediation including, for example, alerts or notifications, or patch deployment to an affected component in the network. The remediation may occur directly via the network appliance or indirectly through another network component. Additionally, a user may generate rules for the automated generation of tags based on patterns seen in the data. The data may also be analyzed by a machine-learning unit which may itself generate tags for the data or which may present potential patterns in the data to a user who may then choose to tag the data in a certain manner. Once the tagged data is received by a network appliance, the network appliance may decide (based, for example, on the values of the data or the tags in the data) if any remediation must occur, and if so, what type and for what element in the network.

Figure 1:
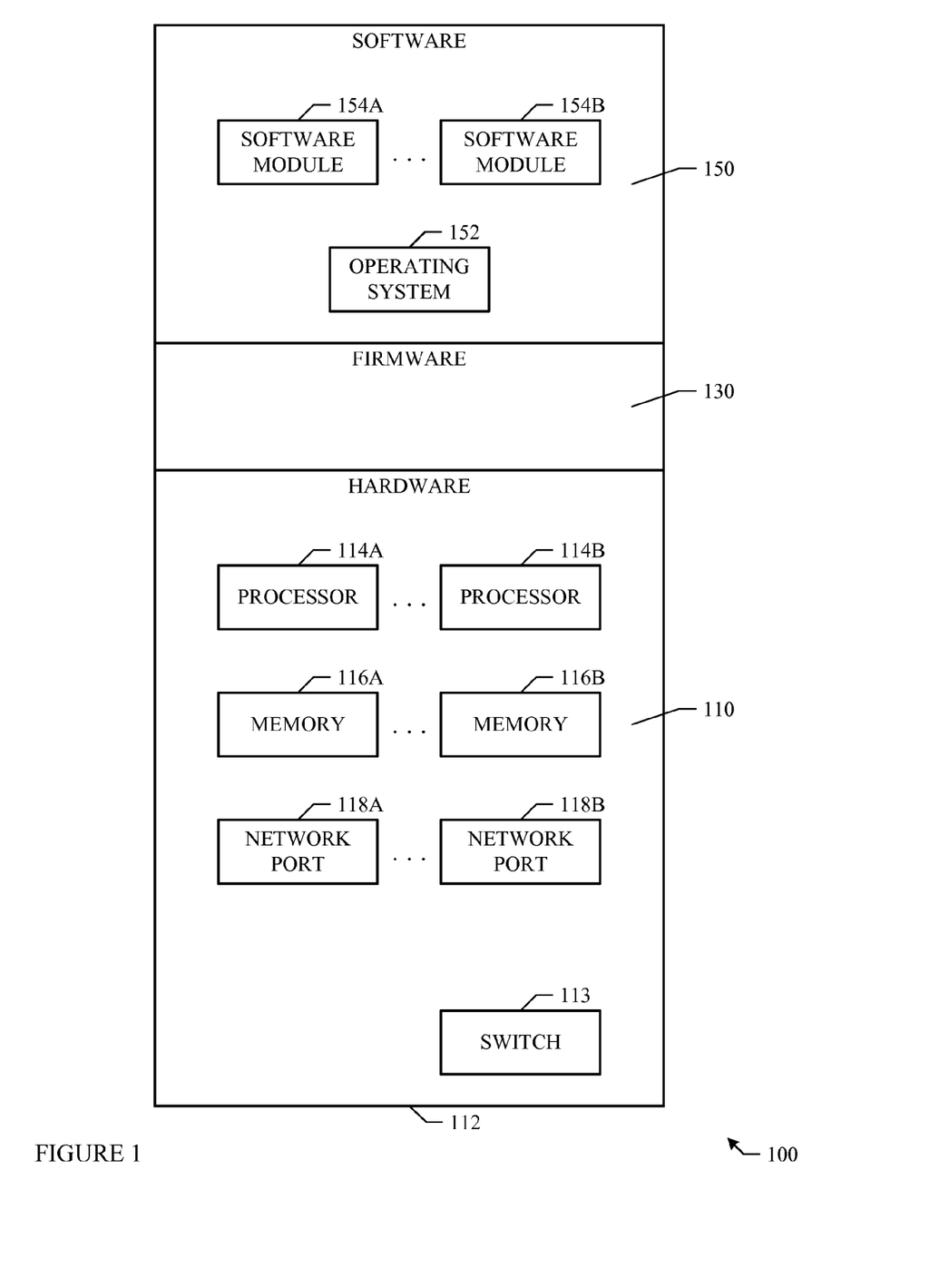
FIG. 1 illustrates an example appliance.

FIG. 1 illustrates an example appliance 100. In particular embodiments, appliance 100 includes hardware 110, firmware 130, and software 150. In particular embodiments, there may be any number of processors 114 that make up part of hardware 110. In particular embodiments, processors 114 may be some type of embedded central processing units (CPU). In particular embodiments, each processor 114 may be a mobile processor. In particular embodiments, each processor 114 is a CPU designed to save power (e.g., low power processor) and produce less heat (e.g., low heat processor) and noise (e.g., low sound processor). In particular embodiments, processors 114 may execute the code implementing software 150 and firmware 130.

In particular embodiments, there may be any number of memory modules 116 that make up part of hardware 110. In particular embodiments, each memory module 116 may be Random Access Memory (RAM), Read Only Memory (ROM), flash memory, hard disk, or any other suitable non-transitory storage media. For example, each memory module 116 may be solid state memory. In particular embodiments, the code implementing software 150 may be stored in memories 116. In particular embodiments, at least one memory module (e.g., memory module 116A) is a non-volatile, non-transitory storage media. In particular embodiments, memory module 116A may be a hard disk, and more specifically, a solid state drive (SSD), which is a data storage device that uses solid-state memory to store persistent data. In particular embodiments, memory module 116A may include an SSD controller. The SSD controller may be an embedded processor that executes firmware-level code. In particular embodiments, there may be a file system on memory module 116A.

In some embodiments, appliance 100 may be connected directly to a video display for access by a user. In some embodiments, when appliance 100 is connected to a computer network, a user may access and control appliance 100 remotely by using an IP address associated with one of its network ports (e.g., network port 118B). For example, a browser-based user interface may be provided, such that when the user enters the IP address associated with network port 118B in a web browser executing on a computing system also connected to the same computer network, the browser-based user interface may be presented to the user in the web browser. The user may then interact with appliance 100 through this user interface (e.g., inputting and sending commands to appliance 100, or reviewing current status and setup of appliance 100). The user, e.g., a network administrator, may use the user interface to access and direct the functionality and capabilities within the appliance. The interface may support a variety of tasks including inventory management, software distribution, scripting, security, help-desk, alerts and reports and appliance settings. Information presented via the interface may include summary data regarding the status and operation of devices on the network collected, for instance, through network scans, activity logging, and activities to inventory the devices on a network for hardware and software information, security information, and/or patch deployment information. Additionally, information may include summary data regarding the network devices and their operating system, software and software distribution statistics, alerts, patches, virus and vulnerability detection, and network scan information. The user interface may also include ratings or level indicators regarding the total security level of all management agents. Example indicators include the number of malware items detected across all managed endpoints, the number of vulnerabilities detected on the network, the number of active critical virus or trojans, the execution of antivirus measures, and summaries of machines remediated to a safe threat level. Other network or appliance data stored in a data store could also be presented.

In particular embodiments, software 150 may include an operating system 152 and any number of software modules 154. In one implementation, operating system 152 may be a Linux-based operating system (e.g., Debian 6 Operating System). Operating system 152 may include a kernel (e.g., a Linux kernel), which provides a bridge between software modules 154 and the actual operations (e.g., data processing) performed at the hardware level (i.e., with hardware 110). Operating system 152 may also include any number of software libraries, which implement and provide various functionalities (e.g., utility functions) that may be used by software modules 154. In particular embodiments, each software module may implement specific functionalities supported by appliance 100. In some embodiments, each appliance supports a broad range of functionalities, including for example network management, deployment, and autoremediation. In particular embodiments, each specific appliance may include one or more software modules implementing one or more specific functionalities, some of which are described in more detail below. As an example, software modules included in an appliance may include a scripting system (e.g., for developing scripts and policies to carry out tasks on network devices in the network) or a filtering system (e.g., for enabling filters to be defined and applied to various devices on the network). In particular embodiments, filters may be defined and applied to network devices based on a wide variety of criteria, including device, user, or other criteria. Additionally, labels associated with each filter may assigned to network devices such as client devices, users, or locations. These labels may be used to target the delivery of inventory, distribution, scripting, security, help desk, and reporting services, Further examples of software modules included in an appliance include a deployment module (e.g., for carrying out remote installation and distribution of applications, service packs, updates, and digital assets), an inventory module (e.g., for collecting information about network devices on the network), a helpdesk module (e.g., for providing helpdesk functions across the network), and a security module (e.g., for scanning and reporting on security vulnerabilities on the network, enforcing security policies, and providing automatic remediation). The software modules included in one appliance may differ from the software modules included in another appliance. Consequently, one appliance may support specific operations different from those supported by another appliance. By selectively installing different software modules on different appliances, the operations supported by each appliance may be customized for specific users. Alternatively, an appliance may incorporate all relevant software modules and provide a broad range of functionalities.

For example, one function may be referred to as "inventory and compliance" function. The main operations supported by an inventory and compliance function are twofold. First, for the "inventory" part, the appliance implementing the inventory and compliance function may collect information about a computer network through the use of agents. In particular embodiments, each agent is a piece of computer software executing on a specific computing device connected to the network. Each computing device connected to the network may have its own agent executing on it. Each agent may collect information about the computing device on which it resides, such as the hardware components of the computing device, the hardware status of the computing device at a given time (e.g., CPU usage, amount of memory available, etc.), the operating system of the computing device, the software applications installed on the computing device, the applications or programs running on the computing device at a given time, which users use the computing device at a given time, etc. The specific types of information collected by each agent may be customized for specific users. Each agent may send all the information collected about its computing device to a data store (which may, in particular embodiments, be a server), and the data store may store the information received from all the agents. In particular embodiments, there may be a browser-based user interface provided with the data store that enables a user (e.g., a network administrator) to review the information collected by the agents about the network. Second, for the "compliance" part, based on the information collected, the appliance implementing the inventory and compliance function may determine whether the various license agreements are observed and satisfied, and alert a user (e.g., a network administrator) if there are any software license compliance issues. For example, if there are 15 copies of license of a software application available and yet, there are 20 copies of that software application installed and running on various computing devices connected to the network, the inventory and compliance appliance may alert the network administrator that there are more copies of the software application installed throughout the network than the number of copies of license available for the software application, and thus the system is not in compliance with the software license.

In one implementation, an appliance may include software modules that implement various system management functionalities. Examples of different types of such functionalities may include, without limitation, Asset Management Appliance, Super Disk Controller, Help Desk Appliance, and Patch Appliance. Appliances implementing such functionalities may perform system-management functionalities and provide appliance-based solutions such as, for example and without limitation automated filters and search, compliance monitoring, inventory, system management, information technology (IT) automation, system deployment, software patching, software inventory and license compliance, endpoint device security, end-user data backup, file movement, scripting, and home network or computing.

Figure 2:
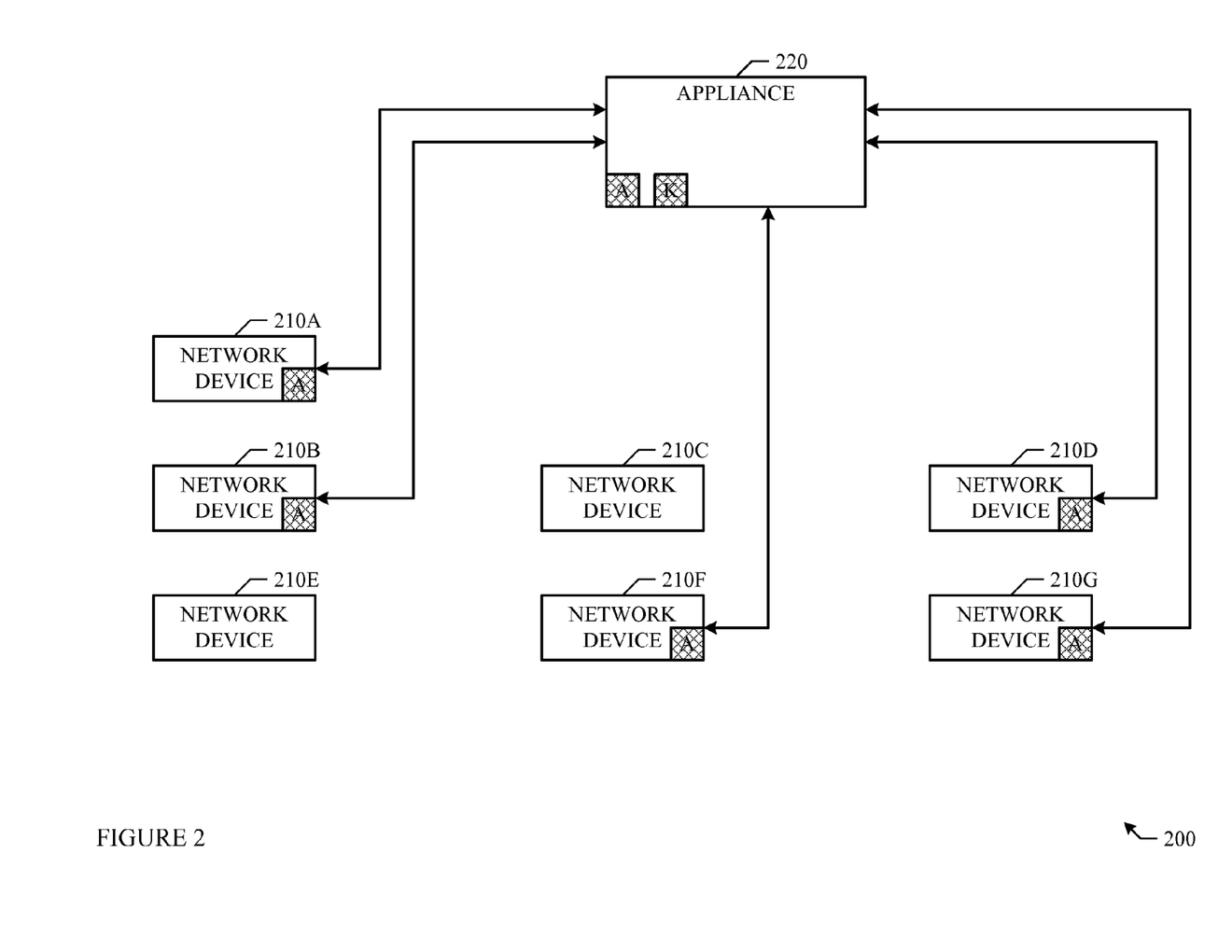
FIG. 2 illustrates an example network with an example appliance connected to it.

In particular embodiments, an appliance, such as the one illustrated in FIG. 1, may be connected to a computer network to perform various operations in connection with the network. FIG. 2 illustrates an example network 200 with an example appliance 220 connected to it (e.g., via an Ethernet connection). In addition, network 200 may include any number of other network devices 210A-210G, such as various types of servers (e.g., application servers, web servers, file servers, database servers, mail servers, etc.) and clients (e.g., desktop computers, notebook computers, mobile devices, etc.), which may be connected to network 200 via wired or wireless connections. Network devices 210 may include servers (including, for example third-party servers) that may communicate patches, updates, definitions, applications, or any other type of data with appliance 220. Network devices 210 may also include an enterprise database, which may communicate data or definitions with appliance 220. A network device 210 may also be a data store containing scripts, policies, plans, structures, or logs for access by appliance 220. Network devices may also include managed endpoints including, for example, routers or switches, or clients (e.g., an administrator). In particular embodiments, each network device 210 is connected to appliance 220 through a persistent connection. Additionally, in particular embodiments, a network device 210 may also include a mini-appliance, as appropriate.

In particular embodiments, network 200 may be an intranet, an extranet, a virtual private network (VPN), a local area network (LAN), a wireless LAN (WLAN), a wide area network (WAN), a metropolitan area network (MAN), a portion of the Internet, or another network 200 or a combination of two or more such networks 200. This disclosure contemplates any suitable network 200.

In particular embodiments, each network device 210 may be a unitary device or may be a distributed device spanning multiple computing devices or multiple datacenters. Each network device 210 may include hardware, software, or embedded logic components or a combination of two or more such components for carrying out the appropriate functionalities implemented or supported by network device 210. A network device 210 may have a web browser, such as MICROSOFT INTERNET EXPLORER, GOOGLE CHROME, or MOZILLA FIREFOX, and may have one or more add-ons, plug-ins, or other extensions, such as GOOGLE TOOLBAR or YAHOO TOOLBAR. A user at network device 210 may enter a Uniform Resource Locator (URL) or other address directing the web browser to another network device 210 or to appliance 220 or to a device on the Internet, and the web browser may generate a Hyper Text Transfer Protocol (HTTP) request and communicate the HTTP request to another device (e.g., appliance 220). Appliance 220 may accept the HTTP request and communicate to network device 210 one or more Hyper Text Markup Language (HTML) files responsive to the HTTP request. Network device 210 may render a web page based on the HTML files from appliance 220 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate. In particular embodiments, a web-based user interface provided by appliance 220 for managing appliance 220 may be accessed in the web browser executing on a network device 210 in such a manner.

Network Discovery and Agent Deployment

In particular embodiments, one purpose for appliance 220 is to discover what specific devices are connected to network 200 for deploying and installing copies of an agent associated with appliance 220 to at least some of these devices connected to network 200. In particular embodiments, the agent, also referred to as Asset Management Agent in some cases, is a piece of software that may execute on a network device 210 for monitoring and collecting information about that network device 210. In particular embodiments, appliance 220 has a copy of the agent together with its installation script, which may be used to install copies of the agent on the individual network devices 210.

There are different ways for network application 220 to discover what specific devices are connected to network 200. In particular embodiments, one of network devices 210 (e.g., network device 210A) may be a discovery device used by a network administrator. Discovery device 210A may help appliance 220 discover the individual devices on network 200 and deploy copies of the agent to at least some of these devices. In particular embodiments, discovery device 210A may function similarly as a bastion host. In general, a bastion host is a special purpose computer on a network specifically designed and configured to withstand attacks. The computer generally hosts a single application (e.g., a proxy server), and all other services are removed or limited to reduce the threat to the computer. It is hardened in this manner primarily due to its location and purpose, which is either on the outside of the firewall or in the demilitarized zone (DMZ) and usually involves access from un-trusted networks or computers. In particular embodiments, the network administrator may manually install a copy of the agent on discovery device 210A. The agent executing on discovery device 210A may establish and maintain a persistent connection between discovery device 210A and appliance 220.

In particular embodiments, appliance 220 may request discovery device 210A, through the copy of the agent executing on discovery device 210A, to discover all the devices (e.g., network devices 220B-220G) connected to network 200. Discovery device 210A may inform appliance 220, through the copy of the agent executing on discovery device 210A, all the devices (e.g., network devices 210B-210G) currently connected to network 200. Appliance 220 may present a list of all the devices currently connected to network 200 to the network administrator through, for example, a web-based interface, so that the network administrator may select, from the list, the specific devices to which copies of the agent should be deployed. For example, suppose that the network administrator selects network devices 210B, 210D, 210F, 210G. Appliance 220 may request discovery device 210A, again through the copy of the agent executing on discovery device 210A, to deploy a copy of the agent to each of network devices 210B, 210D, 210F, 210G. Once a copy of the agent is installed and executed on each of network devices 210B, 210D, 210F, 210G, the agent may establish and maintain a persistent connection between each of network devices 210B, 210D, 210F, 210G and appliance 220. Note that in particular embodiments, since copies of the agent are not deployed to and installed on network devices 210C, 210E, there may not be persistent connections between network devices 210C, 210E and appliance 220.

In particular embodiments, a Deployment Server (e.g., one of network devices 210) may be employed to distribute copies of the agent. The Deployment Server is responsible for determining which devices are connected to network 200 and whether those devices each have a copy of the agent installed thereon. In addition, if a network device 210 does not have a copy of the agent installed thereon, the Deployment Server is responsible for installing a copy of the agent on that device. In one implementation, the Deployment Server may be manually selected (e.g., by a network administrator). A copy of the agent may be downloaded from appliance 220 to one of network devices 210 that is to function as the Deployment Server, and installed on the Deployment Server. By default, appliance 220 assigns the first device having a copy of the agent as the Deployment Server, but any device with a copy of the agent may be designated (e.g., by a network administrator) as the Deployment Server. In addition, the Deployment Server may be changed to another device 210 at any time (e.g., via the user interface provided with appliance 220).

The Deployment Server then queries network 200 for other network devices 210 and reports the information to appliance 220. In particular embodiments, the Deployment Server may continue query network 200 looking for new devices from time to time (e.g., every 6 hours) and report the updated information to appliance 220 as it becomes available.

Alternatively, in particular embodiments, appliance 220 may discover what devices are connected to network 200 itself, using a slow and random scan of network 200, so that the scanning of network 200 performed by appliance 220 does not interfere with network traffic and is not stopped by the security mechanism of network 200. In particular embodiments, the scanning of network 200 may use a combination of simple network management protocol (SNMP) scanning and ping scanning. More specifically, appliance 220 may ping each IP address within the address range of network 200 to see whether a specific IP address is alive (e.g., is associated with a network device). The ping may be done randomly with respect to the IP addresses (i.e., the IP addresses are pinged randomly, not in sequence). If a specific IP address is alive, appliance 220 may perform a deeper scan of the IP address using SNMP scanning to obtain more information about the network device having the IP address.

In particular embodiments, after appliance 220 discovers the individual network devices connected to network 200, again, appliance 220 may present a list of all the devices currently connected to network 200 to the network administrator so that the network administrator may select, from the list, the specific devices to which copies of the agent should be deployed. In some implementations, appliance 220 may maintain an Inventory list that contains all network devices 210 discovered on network 200. In addition, appliance 220 may keep track of which network devices 210 have a copy of the agent installed thereon and which do not. Thus, when presenting a list of network devices 210 currently connected to network 200 to the network administrator, those devices 210 that already have copies of the agent may be visually distinguished from those devices 210 that do not yet have copies of the agent installed (e.g., an icon representing the agent may be displayed next to each device 210 that already has a copy of the agent installed thereon). Appliance 220 thus is able to track the inventory (e.g., network devices 220 and their status) for network 200.

In particular embodiments, for a device 210 that does not yet have a copy of the agent installed thereon, The Deployment Server may install a copy of the agent on that device 210. In some implementations, by default, the Deployment Server installs a copy of the agent on a device 210 with the same configuration as its own copy of the agent (e.g., including appliance 220 server name and other agent parameters based on the credentials supplied by the network administrator).

In particular embodiments, the copy of the agent executes on each of network devices 210B, 210D, 210F, 210G may monitor and collect informational about each of network devices 210B, 210D, 210F, 210G and transmit the collected information to appliance 220. Appliance 220 may store and processes the information about network devices 210B, 210D, 210F, 210G as needed.

In particular embodiments, the copy of the agent executing on each of network devices 210A, 210B, 210D, 210F, 210G communicates with appliance 220 using asynchronous messaging protocol (AMP), which is a communications protocol for sending multiple asynchronous request/response pairs over the same connection. Requests and responses are both collections of key/value pairs. The copy of the agent executing on each of network devices 210A, 210B, 210D, 210F, 210G listens for and receives commands from appliance 220 and performs operations as directed by appliance 220. Thus, in particular embodiments, the copies of the agent on network devices 210A, 210B, 210D, 210F, 210G are continuously executed while network devices 210A, 210B, 210D, 210F, 210G are powered on and running.

In particular embodiments, the specific commands sent to each copy of the agent may be implemented as plug-ins to the agent. Different commands may be sent to different copies of the agent executing on different network devices as different plug-ins. Consequently, each copy of the agent may be customized to perform different operations depending on the specific network device on which it resides and executes. For example, one command may be for collecting inventory information. The copy of the agent on a network device may be directed to collect monitor and information such as the specific software applications installed and executed on that network device, the number of users using each software application, etc.

In particular embodiments, the agent is a single-thread process. It performs one command (i.e., one task) at a time.

In particular embodiments, tasks described below may be carried out on the network devices 210 without an agent, i.e. in an agentless context. This may be accomplished through the use of software and protocols installed on network devices 210 as part of their operating system or other software applications installed on network devices 210. In an embodiment, depending on its operating environment, the network device 210 operates in accordance with a log 4j, Common Internet File System (CIFS), Secure Shell (SSH), or Simple Network Management Protocol (SNMP) protocol.

Scheduling and Performance

In particular embodiments, there may be a software module, which may be referred to as the "konductor," residing and executing on appliance 220. In particular embodiments, the konductor maintains a list of tasks (e.g., as a queue) that need to be performed by the copies of the agent executing on the network devices (e.g., network devices 210A, 210B, 210D, 210F, 210G) connected to appliance 220. The konductor may assign specific tasks to each copy of the agent when needed so that the copy of the agent may perform these tasks accordingly.

In particular embodiments, when the konductor assigns tasks to each copy of the agent, the konductor may consider how busy appliance 220 and network 200 currently are to balance the work load for appliance 220. The konductor may analyze various relevant factors to determine how busy appliance 220 or network 200 is, such as, for example and without limitation, the CPU or memory usage of appliance 220, the number of tasks being performed concurrently by appliance 220, the number of tasks in the task queue, the traffic load and available bandwidth of network 200, etc. For example, when appliance 220 is not too busy, the konductor may increase the number of tasks sent to the copies of the agent executing on network devices 210A, 210B, 210D, 210F, 210G to be performed. Conversely, when appliance 220 is very busy, the konductor may decrease the number of tasks sent to the copies of the agent executing on network devices 210A, 210B, 210D, 210F, 210G to be performed. If there is no task currently in the queue to be sent out, the konductor may go into a standby mode for some period of time.

In particular embodiments, there may be a feedback mechanism that enables the konductor to determine how busy appliance 220 is at a given time. The feedback mechanism may take into consideration relevant information such as, for example and without limitation, the CPU or memory usage of appliance 220, the number of tasks being performed concurrently by appliance 220, the number of tasks in the task queue, the traffic load and available bandwidth of network 200, etc. at a given time to determine how busy appliance 220 is at that time, and respond accordingly.

Error Detection and Hardware Reset

In particular embodiments, a web-based interface may be provided that enables a user to interact with the appliance via a web browser executing on another network device by, for example, accessing the IP address of the appliance through the web browser. The user may input the IP address of the appliance into the web browser to establish a network connection (e.g., a hypertext transfer protocol (HTTP) connection) to the appliance. A web-based interface may be presented to the user in the web browser. The user may change various settings of the appliance through the web-based interface.

If there are errors in the settings of an appliance, especially if there is a problem with the IP address of the appliance (e.g., the IP address of the appliance is corrupted or wrong), the user may not be able to connect to the appliance through its erroneous IP address to resolve the problems and reset the appliance. In particular embodiments, the user may need to reset the appliance by either shutting down the appliance using the power switch (e.g., switch 113 of appliance 100 illustrated in FIG. 1) or pushing the reset button if one is provided. In particular embodiments, shutting down an appliance may reset all settings of the appliance to their default values and the database to the original factory state.

However, shutting down an appliance may result in all customer settings being lost, which may not be desirable under some circumstances. In particular embodiments, as described above, there are at least two network ports provided with an appliance (e.g., network ports 118A and 118B of appliance 100 illustrated in FIG. 1). Each network port has its own IP address. Generally, a user accesses and interacts with the appliance through one network port (e.g., network 118A illustrated in FIG. 1) using the IP address of this first network port. If the IP address of the first network port is corrupted due to any reason, the user may still access and interact with the appliance through the other network port (e.g., network 118B illustrated in FIG. 1) using the IP address of this second network port. In particular embodiments, the second network port is dedicated for error recovery purposes, and enables a user to reset the appliance under any circumstances, especially when the appliance has specific settings that need to be fixed individually.

Failure or Error Recovery

Figure 3:
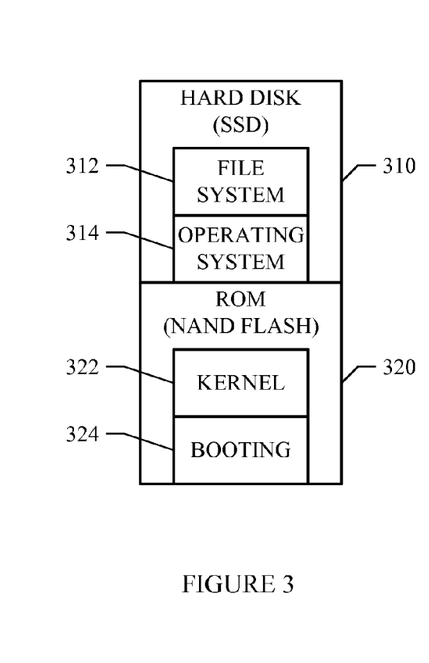
FIG. 3 illustrates an example memory configuration of an appliance.

As indicated above, the hardware of an appliance may include any number of memory modules (e.g., memory modules 116A and 116B of appliance 100 illustrated in FIG. 1). These memory modules provide various types of storage. FIG. 3 illustrates an example memory configuration of an appliance. In particular embodiments, an appliance has certain amount of read only memory (ROM) 320 and a hard disk 310. In particular embodiments, ROM 320 may be NAND Flash memory, and the hard disk may be a solid state disk (SSD). In particular embodiments, the appliance has a Linux-based operating system. Booting code 324 and kernel 322 of the Linux-based operating system are stored in ROM 320, and Linux-based operating system 314 and a file system 312 are stored on hard disk 310. In particular embodiments, Booting code 324 includes a bootloader, called U-boot, which is an open source bootloader for Linux running on embedded systems.

During the booting process of the appliance, booting code 324 is loaded first, followed by kernel 322, followed by operating system 314, and followed by filed system 312. In order for the appliance to boot up correctly, at least booting code 324 and kernel 322 must be perfectly correct. However, it is possible for any of booting code 324, kernel 322, operating system 314, and file system 312 to be corrupted. When this happens, the appliance cannot be booted up successfully. Particular embodiments provide some means to recover from some of these memory failures.

If any part of kernel 322 is corrupted, particular embodiments may provide some means to recover the kernel. In particular embodiments, booting code 324 may be able to detect whether there is any problem with kernel 322 stored in ROM 320, since booting code 324 is loaded before kernel 322. In particular embodiments, a copy of the kernel may be stored on hard disk 310. In particular embodiments, the copy of the kernel may be stored in a special recovery section on hard disk 310. If kernel 322 in ROM 320 is corrupted in any way, during booting of the appliance, kernel 322 is ignored (i.e., not loaded). Instead, after loading booting code 324, the process attempts to access (i.e., boot) the recovery section of hard disk 310 to retrieve the copy of the kernel stored therein and copy the kernel back into ROM 320. Once an uncorrupted copy of the kernel is copied back into ROM 320 as kernel 322, kernel 322 may be loaded normally.

File system 312 may also be corrupted. For example, file system 312 may fail completely such that it is not accessible at all. Or, file system 312 may fail partially such that some of the data stored therein are lost. If any part of file system 312 is corrupted, particular embodiments may provide some means to recover the file system. In particular embodiments, a copy of file system 312 may be stored in ROM 320 (e.g., in NAND flash). In particular embodiments, the copy of file system 312 stored in ROM 320 is compressed. If file system 312 is corrupted in any way, during the booting of the appliance, the process accesses the copy of file system 312 stored in ROM 320 and copies the file system back onto hard disk 310 by reimaging the file system. Alternatively or in addition, in particular embodiments, a copy of file system 312 may be stored on a server accessible to the appliance (e.g., in a data cloud). If file system 312 is corrupted in any way, during the booting of appliance, the process may access the server and download the copy of the file system from the server and reimage the file system back onto hard 310.

Software License Compliance

As described above, there may be a copy of an agent provided by an appliance residing and executing on each network device connected to the appliance for collecting information about that network device (e.g., as illustrated in FIG. 2). This agent may be referred to as the "inventory" agent, and may collect and report hardware details and provide a list of software (including the operating system) installed on the corresponding device. The collected information may be transmitted to the appliance for storage, processing, and analysis. One way to use the collected information is to ensure software license compliance for the computer network. For example, each agent may collect information indicating which software application is installed and executed on a corresponding network device and information describing that software application (e.g., title, version, release date, manufacture, current license status, etc.).

Such information may be used to ensure software license compliance among the network devices. For example, the appliance may analyze the collected information received from the agents executing on the network devices to ensure license compliance for the software applications installed and executing on these network devices. There may be several compliance models provided with an appliance.

In particular embodiments, the first compliance model may be referred to as the "counting model". For example, if there are five copies of the license for a software application available for a computer network, then there should be no more than five copies of the software application installed and executing on the network devices in the network. The information collected by the copies of the inventory agent executing on the network devices may be analyzed to determine how many copies of the software application are installed and executing on the network devices in total. If the number of copies of the software application installed and executing on the network devices is more than the number of copies of the license for the software application available, then the network administrator may be notified that the network fails to comply with the license agreement for the software application. The counting model thus compares the total number of copies of a software application installed and executing on the network devices in a network with the total number of copies of the license for the software application available for the network. If the former number is greater than the latter number, then the network does not comply with the license agreement for the software application.

Often, a software application may have many versions. When copies of the software application are installed on the individual network devices, some network devices may have one version of the software application while other network devices may have another version of the software application. On the other hand, the license for the software application is usually for the application itself, not for specific versions of the application. Thus, when determining the total number of copies of the software application installed and executing on the network devices in a network, particular embodiments may take into account all different versions of the application installed on the network devices. To do so, particular embodiments may group the software applications found on the individual network devices, such that different versions of the same application are grouped together. In particular embodiments, the grouping of the software applications may be based on various factors, such as, for example and without limitation, the title, manufacture, version, and installation date of each application. For example, when comparing two application titles, particular embodiments may compute the text distance between the two titles, and if the distance is smaller than a threshold, then the two titles are considered the same. Particular embodiments may present the groups of the software applications to a network administrator, and enable the network administrator to adjust the grouping, when necessary, and provide feedbacks through, for example, a web-based interface. The feedback provided by the network administrator may be used in future grouping of the software applications. Particular embodiments may enable the network administrator to define specific application groups and associate various criteria with each group. Software applications that satisfy the criteria of a specific group are assigned to that group.

Sometimes, a software suite may include any number of individual applications. For example, Microsoft Office includes Word, Excel, Outlook, Power Point, Access, and Publisher. Yet, the license is for the software suite, not for the individual applications included in the suite. Thus, when determining the total number of copies of the software suite installed on the network devices in a network, particular embodiments may examine the individual applications in the software suite that are installed on the network devices. To do so, particular embodiments may group the software applications found on the individual network devices, such that the applications in the same software suite are grouped together.

In particular embodiments, the second compliance model may be referred to as the "authorization model". Given a software application, a network administrator may be presented with a list of the network devices in a computer network, from which the network administrator may indicate to an appliance which specific network devices are authorized to have a copy of the software application, using, for example a web-based interface provided with the appliance. Thereafter, the information collected by the copies of the inventory agent executing on the network devices connected to the appliance may be analyzed to determine if any network devices not authorized to have copies of the software application actually have copies of the software application installed thereon. If so, then the network does not comply with the license agreement for the software application, and the network administrator may be notified, including the identities of the unauthorized network devices that do have a copy of the software application installed.

In particular embodiments, the third compliance model may be referred to as the "license key model". Given a software application with a number of copies of the license, a network administrator may indicate to an appliance which specific network device is assigned which specific license key of the software application, using, for example a web-based interface provided with the appliance. Thereafter, the information collected by the copies of the agent of the appliance executing on the network devices connected to the appliance may be analyzed to determine if any network devices not authorized to have license keys of the software application actually have copies of the software application installed thereon or if any network device authorized to have one license key actually has another license key. If so, then the network does not comply with the license agreement for the software application, and the network administrator may be notified, including the identities of the network devices that causes the license compliance problems.

In particular embodiments, an appliance may support all available compliance models, and a network administrator may select which model to use for managing software compliance throughout a network. In addition, the user may select specific pieces of software to be managed for license compliance. In particular embodiments, when a piece of managed software installed on one or more computer systems becomes out-of-compliance or the license of the software expires, a notification is posted in the user interface provided by the appliance or sent to the user. In addition, the appliance may generate a compliance report for all managed software installed throughout the network.

Software Patching

Often, there may be different versions of a piece of software (e.g., operating system or software applications). A new version of a piece of software may include updates, bug fixes, or new features. Sometimes, a new version of a piece of software is referred to as a "patch", and the process of updating the software to the new version is referred to as "patching". In particular embodiments, an appliance supports patch management (e.g., updating the software installed on the network devices managed by the appliance to new versions).

In particular embodiments, an appliance enables its users to configure and control how and when the software installed on the network devices under its management is updated (i.e., patched). For example, a user may choose which piece of software to update or which patches to download and install (e.g., the user may choose to download only the operating system and application patches relevant to his network, thus eliminating the need to manage patches that are not applicable). Different network devices may have different schedules for vulnerability assessment and patching, and some network devices may have higher priority than others (e.g., critical network devices may have their software updated without delay). The appliance may offer intuitive search capabilities and views that allow its users to quickly filter through large numbers of patches and easily track patch deployment status.

In particular embodiments, once the user has configured the patch management functionality with an appliance, the appliance may perform patching automatically (e.g., based on a predefined schedule) or upon receiving a single command from the user (e.g., a click of a button that causes patching to be performed—one-click patching).

In particular embodiments, the appliance may help its users coordinate patching updates across complex and distributed user bases and network devices. Through a web-based user interface, a user may control scheduling of the patches with the ability to set up patch windows with hard stops to ensure no interruption for users of the network devices during normal business hours. A summary on patch management and deployment progress and status may be presented to a user, which allows the user to quickly confirm that patches have rolled out successfully and that systems are in compliance, and identify and remediate those systems where patching has failed.

Help Desk

In particular embodiments, an appliance supports a "help desk" feature, which provides help to its users on various technical issues. For example, the appliance may help its users identify technical problems in a manageable way, effectively automating IT management. Example functionalities related to the help desk feature may include, without limitation, trouble ticket submission, problem tracking and management integrated with the appliance knowledge base, hardware and software inventory, remote control, and customizable reporting.

Localization

In particular embodiments, an appliance supports localization of various languages (e.g., French, German, Italian, Chinese, etc.). The web-based interface that enables a user to interact with the appliance may be customized for different languages. There may be different versions of the appliance, each certified by a different country (e.g., environmental certification).

Reporting

In particular embodiments, an appliance may report various types of information, such as, for example and without limitation, software-compliance status, network status, agent deployment status, performance status, errors, etc., to its users (e.g., network administrators). The appliance may report the information in several ways. As one example, the appliance may provide a user interface, referred to as the Dashboard, which displays the appropriate information. The user may log onto the appliance to view the Dashboard and the information presented therein. As another example, the appliance may send the information using RSS feeds so that the user may receive information without actually logging onto the appliance. The user may subscribe to the RSS feeds by logging onto the appliance and follow the instructions provided by the appliance. The user may subscribe to all notifications or specific categories of notifications.

Information Analysis and Automated Remediation

In particular embodiments, information or data gathered from network devices 210 (e.g., server, endpoint or client devices, or mini-appliances) may be stored in a data store accessible to network 200. This data may include data related to the operation or security of network devices 210 in network 200. For example, the data may include inventory information, scripts, policies, plans, structures, or logs of network status or activities including network security events, the security state of a network device, the operational state of a network device, the type of hardware or software present in a network device, or the status of a network device (e.g., the amount of CPU usage of the device, or the amount of memory available in the device). The data may be structured data (e.g., data that may reside in fixed fields, such as data suitable for use in a relational database) or unstructured data (e.g., free-form text), and may or may not be human-readable. The data may be stored in a data store in a system log, in a table, in a database, or any other suitable data structure. Data stored in this data store may be accessed and used by an appliance for performing tasks including patching, software installations, various security functions, or reporting. Data may be organized and accessed by a user (e.g., a network administrator) into libraries, reports, or any other suitable form.

In particular embodiments, the data gathered from network devices 210 may be gathered in a manner that is not intrusive to the operation of network devices 210 or network 200. As an example, data may be gathered with a particular frequency and at particular times of day that may be chosen by a user (e.g., a network administrator) or that may be automatically determined (e.g., by a network appliance). As an example, data may be gathered every day, every week, or every month from network devices 210. Additionally, the frequency with which data is gathered may also depend on other factors including, for example, the type of data being gathered. For example, data related to security events may be gathered more frequently (e.g., every hour) than data related to the type of hardware in a network device.

In particular embodiments, the data gathered from the network 200 and network devices 210 may be stored in its raw form. Additionally, in particular embodiments, the raw data may be indexed (e.g., for future data retrieval/search or analysis purposes) or cached. The raw data may, in particular embodiments, be archived (e.g., moved to longer-term data storage). Raw data may be archived after a pre-determined amount of time, for example after 30 days, after 60 days, or after 90 days. The amount of time before raw data is archived may depend on a variety of factors including business needs, storage availability, or user preferences. The raw data may be retrieved from an archive as required by a user.

The data (e.g., structured or unstructured data) gathered from network devices 210 may be indexed. The index may include associations between keys and values (e.g., key-value pairs). For example, individual terms (or keys) in each collection of data (e.g., each system log) in the data store may be associated with values. The indexing may be used for searching specific terms in the store of data (e.g., the system log or logs). The terms in the system log may be indexed using inverted indexing, in which content (e.g., keys including words or numbers) may be mapped to locations or positions in a database file, document, or set of documents (e.g., system logs). This disclosure contemplates any applicable indexing algorithm. In addition, particular embodiments may extract and analyze the metadata (e.g., title, tags, timestamp, etc.) associated with each system log or other collection of data.

Upon receiving a search query from a user (e.g., a network administrator), a search engine may use the index to determine which collection of data contains all or most or some of the query keywords, and what corresponding values may be associated with those keywords in the collection of data. The results provided to a user may be used to analyze data. As an example, a user such as a network administrator may desire to see the last 30 days of data related to a particular pressure sensor in network 200. The user may then enter a search query with keywords that correspond to the keys associated with pressure, the time period, and the particular sensor, and the search results returned may be the values of pressure data of the sensor over the certain time period. The user may then see this data in a user interface, such as a browser. Data analysis based on search results may include time-series analysis, data transforms (including, e.g., Fourier transforms), correlation, regression, interpolation, extrapolation, or any other suitable data analysis technique.

In particular embodiments, a user (e.g., network administrator) may specify any of a number of tags or labels to be added to data in the data store. A user may specify any attributes of the data with such tags or labels, including, for example, membership in a group or associations between different data. As an example, the user may specify that a group of five computers in network 200 are computers belonging to a human resources department. The user may specify this by adding a tag manually to the data representing these computers (e.g., via a user interface) that specifies that these computers belong to a department and that this department is the human resources department. As another example, a user may receive an alert from, for example, an appliance regarding the storage usage in the network and do a query to see the value of storage usage of the devices in network 200 over a period of time. The user may then see a time series graph of the search results of this query via a user interface. By analyzing this graph and seeing when in time, for example, a storage usage threshold is approached, the user may decide to add a new tag to the data collection corresponding to storage usage. For example, the user may add a tag called "my_max_storage" corresponding to the storage usage of the network 200. Then, based on this tag, the user may create a rule that states that any time the value associated with the key "my_max_storage" reaches the value "50," a new tag is automatically created for the data corresponding to storage usage. Then, if "my_max_storage" reaches the value 50, without the user needing to intervene, a new tag (e.g., "max_storage_reached") will be generated and added to the data representing the storage usage. This data may then be directed to an automated remediation system (e.g., one or more appliances in communication with a network). The remediation system may then check to see if the tag "max_storage_reached" is associated with the data, and if so, the remediation system may then take a particular course of action to remedy the situation. Examples of action taken by a remediation system include sending an email, sending an alert, or taking an action such as executing a script. As an example, if the maximum storage capacity is reached, an email or alert may be sent, or a script may be executed on one or more network devices 210 to alleviate the amount of storage being used. In this manner, metadata in the form of labels or tags may be added to data but may not be generated solely from the data itself. Additionally, as described above, these labels or tags may be generated manually (e.g., by the user) or automatically (e.g., based on rules created by a user).

In particular embodiments, labels or tags may be generated automatically using machine learning or clustering algorithms. Generally, machine-learning algorithms may take advantage of data to capture patterns, relationships, or characteristics of interest in the data. The algorithms may also be used to make intelligent decisions based on the data. Any suitable type of machine-learning algorithm may be used to generate labels or tags including, for example, supervised learning, unsupervised learning, semi-supervised learning, reinforcement learning, or transduction. In the case of multivariate detection, machine-learning algorithms may be used to detect patterns in multiple variables and generate tags based on these patterns. For example, it may be difficult for a user to detect the pattern that when device A has a CPU load of 80%, and device B has a temperature of 81 degrees Fahrenheit, device C shuts down. A machine-learning algorithm may, based on previous data related to these devices, detect this pattern and automatically generate a tag "device_C_danger" that is added to data to be sent to a remediation system. In this manner, without a user's intervention, the remediation system may see that device C may be in danger of shutting down and take the appropriate actions to safeguard data on device C, while also taking other actions related to the CPU load of device A and the temperature of device B.

In addition to generating tags or labels automatically, a user may be given suggestions regarding potential patterns in the data collection. A user, generally, may be interested in whether two variables are correlated. For example, a system administrator may be interested in noting whether the failure of a particular device is correlated with a CPU load on a second device. The user may perform a query using keywords corresponding to the device status of the first device and the CPU load of the second device. The value returned may then be analyzed by the user using, for example, a user interface. Additionally, perhaps the user did not think that the failure of the first device was at all related to a CPU load of the second device. Using machine-learning, for example, the system may detect this pattern on its own and suggest to the user (e.g., via user interface) that the failure of the first device always (or frequently) coincides with a high CPU load of the second device. The user may then, when presented with such potential patterns, decide whether the pattern is of interest to the user or not, and may choose to create a tagging rule for the system based on this pattern. Based on these types of suggestions, the user may also choose to perform a search query to get more detailed information about potential patterns. Additionally, the user may be presented with a set of conditions in the system (determined based on the data in the data store) and be asked whether the set of conditions is normal or not. For example, if computing load is higher on a Friday evening than at other times of the week, the system may detect this pattern, ask the user if this is still normal (because, for example, it may not be a normal usage level at other times in the week) and receive input from the user. Finally, there may be some pre-set pattern detection or tagging rules based on known information relating to network devices 210. As an example, if the hardware of a certain device has a known maximum operating temperature of 100 degrees Fahrenheit, there may be a pre-set automatic tagging rule that any time the device reaches 90 degrees, a tag is generated for the device that alerts the remediation system that the action must be taken.

In particular embodiments, a combination of pre-set configurations and user input may direct the management of network devices 210. For example, if a system consists of network devices 210 with hardware having a known safe operating temperature ceiling, there may be pre-set tagging rules to present the user with information (e.g., via an alert) any time network devices 210 are approaching their known safe operating temperature ceiling. The user, however, may view this presented pattern or alerts and determine that, in the particular set of circumstances of the network of the user, these network devices may, in fact, exceed the known safe operating temperature ceiling. The user may, therefore, tell the system that, in fact, the condition of one or more of the network devices 210 exceeding this temperature ceiling is actually "normal" (perhaps during a set-up or after a short initial period of data collection). The user may also tell the system he would like to monitor whether any one network device 210 reaches a known dangerous operating temperature. The system may again make some suggestions for pre-set values relating to the temperature of network devices 210 or for other types of data to monitor. Later, the user may update the pre-set configurations after having viewed more data and determining more accurately that, due to changed circumstances (e.g., changed network configuration or network demands), it is no longer "normal" for any network device 210 to exceed the known safe operating temperature ceiling. The user may notify the system via, for example, a new tagging rule that the system should monitor and remediate any time the known safe operating temperature ceiling is approached in any network device 210.

Figure 4:
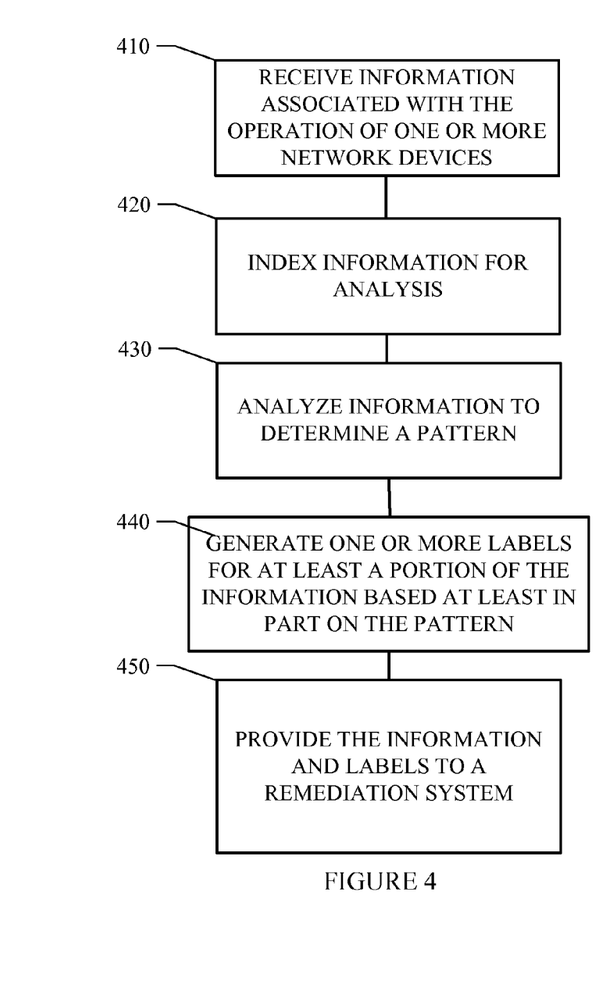
FIG. 4 illustrates an example method for automated remediation.

FIG. 4 illustrates an example method for automated remediation. The method may start at step 410, where information (e.g., operational or security data) associated with the operation of one or more network devices (e.g., 210) is received (e.g., by an appliance or a data store). At step 420, the information is indexed for analysis, e.g., using an inverted index or any other suitable indexing method. At step 430, the information is analyzed to determine a pattern (e.g., a relationship between variables in the data). At step 440, one or more labels or tags are generated for at least a portion of the information based on the pattern. At step 450, the information and the labels are provided to a remediation system, which may then take action based on the labels. Particular embodiments may repeat the steps of the method of FIG. 4, where appropriate. Moreover, although this disclosure describes and illustrates particular steps of the method of FIG. 4 as occurring in a particular order, this disclosure contemplates any suitable steps of the method of FIG. 4 occurring in any suitable order. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Computer System

Figure 5:
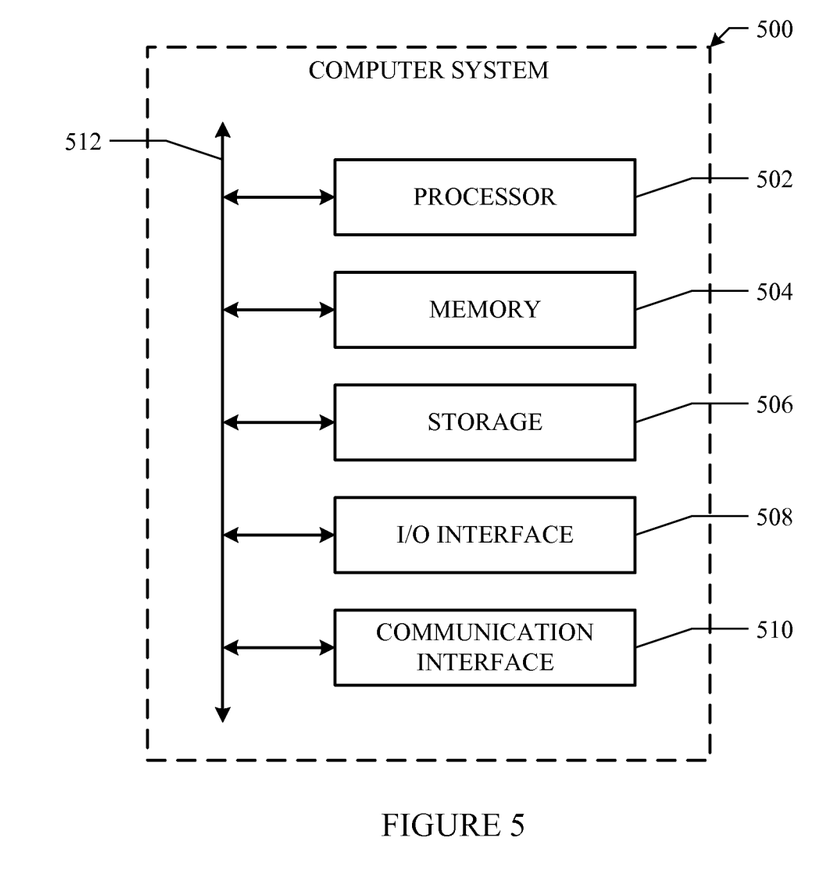
FIG. 5 illustrates an example computer system.

Particular embodiments may be implemented on one or more computer systems. FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Although the present disclosure has been described in detail, it should be understood that various changes, substitutions, and alterations can be made hereto without departing from the spirit and the scope of the invention as defined by the appended claims.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   receiving information associated with the operation of one or more network devices;
   indexing the information for analysis;
   analyzing the information to determine a pattern in the information;
   generating one or more labels for at least a portion of the information based at least in part on the pattern;
   appending the generated labels to the portion of the information; and
   making the information and labels available to a remediation system, wherein the remediation system is operable to automatically take an action in response to the information or labels.

2. The method of claim 1, wherein analyzing the information to determine a pattern in the information is performed by a machine-learning system.

3. The method of claim 2, wherein generating one or more labels for at least a portion of the information is performed by the machine-learning system.

4. The method of claim 2, wherein a user generates one or more labels for at least a portion of the information based at least in part on the pattern.

5. The method of claim 1, wherein the remediation system is operable to automatically take an action in response to the information and labels, the action comprising:
   sending an alert;
   sending an email; or
   executing a script.

6. The method of claim 1, wherein a user analyzes the information to determine a pattern in the information and generates one or more labels for at least a portion of the information based at least in part on the pattern.

7. The method of claim 1, wherein the information comprises unstructured data.

8. One or more computer-readable non-transitory storage media embodying software operable when executed by one or more computer systems to:
   receive information associated with the operation of one or more network devices;
   index the information for analysis;
   analyze the information to determine a pattern in the information;
   generate one or more labels for at least a portion of the information based at least in part on the pattern;
   append the generated labels to the portion of the information; and
   provide the information and labels to a remediation system, wherein the remediation system is operable to automatically take an action in response to the information or labels.

9. The media of claim 8, wherein a machine-learning computer system is operable to analyze the information to determine a pattern in the information.

10. The media of claim 9, wherein the machine-learning computer system is operable to generate one or more labels for at least a portion of the information.

11. The media of claim 9, wherein a user generates one or more labels for at least a portion of the information based at least in part on the pattern.

12. The media of claim 8, wherein the remediation system is operable to automatically take an action in response to the information and labels, the action comprising:
    sending an alert;
    sending an email; or
    executing a script.

13. The media of claim 8, wherein a user analyzes the information to determine a pattern in the information and generates one or more labels for at least a portion of the information based at least in part on the pattern.

14. The media of claim 8, wherein the information comprises unstructured data.

15. A system comprising:
    a network appliance; and
    one or more network devices communicatively coupled to the network appliance;
    wherein the network appliance is operable to:
    receive information associated with the operation of the one or more network devices;
    index the information for analysis;
    analyze the information to determine a pattern in the information;
    generate one or more labels for at least a portion of the information based at least in part on the pattern;
    append the generated labels to the portion of the information; and
    provide the information and labels to a remediation system, wherein the remediation system is operable to automatically take an action in response to the information or labels.

16. The system of claim 15, wherein a machine-learning processor is operable to analyze the information to determine a pattern in the information.

17. The system of claim 16, wherein the machine-learning processor is operable to generate one or more labels for at least a portion of the information.

18. The system of claim 16, wherein a user generates one or more labels for at least a portion of the information based at least in part on the pattern.

19. The system of claim 15, wherein the system is operable to automatically take an action in response to the information and labels, the action comprising:
    sending an alert;
    sending an email; or
    executing a script.

20. The system of claim 15, wherein a user analyzes the information to determine a pattern in the information and generates one or more labels for at least a portion of the information based at least in part on the pattern.

* * * * *